United States Patent [19]

Wilson

[11] Patent Number: 4,799,868
[45] Date of Patent: * Jan. 24, 1989

[54] COMPRESSOR/PUMP

[76] Inventor: Clifford E. Wilson, 128 College St., Madisonville, Tenn. 37354

[*] Notice: The portion of the term of this patent subsequent to Jan. 5, 2005 has been disclaimed.

[21] Appl. No.: 139,856

[22] Filed: Dec. 30, 1987

Related U.S. Application Data

[63] Continuation-in-part of Ser. No. 878,350, Jun. 25, 1986, Pat. No. 4,716,870.

[51] Int. Cl.$^4$ .............................................. F04C 18/00
[52] U.S. Cl. ....................................................... 418/36
[58] Field of Search ................... 123/213, 245; 418/35, 418/36, 37, 38; 74/393, 437

[56] References Cited

U.S. PATENT DOCUMENTS

| | | |
|---|---|---|
| 1,353,099 | 9/1920 | Wales . |
| 1,676,211 | 7/1928 | Bullington ............................ 418/36 |
| 2,651,206 | 9/1953 | La Veille . |
| 3,034,449 | 5/1962 | Moore .............................. 418/36 X |
| 3,080,856 | 3/1963 | Berry . |
| 3,500,798 | 3/1970 | Arnal ..................................... 418/36 |
| 3,516,392 | 6/1970 | Morgan . |
| 3,580,228 | 5/1971 | Rocha . |
| 3,602,203 | 8/1971 | Mowry . |
| 3,696,797 | 10/1972 | Kessler ........................... 123/245 X |
| 3,890,939 | 6/1975 | McIntosh ............................. 418/36 |
| 3,908,608 | 9/1975 | Fox ..................................... 123/213 |

Primary Examiner—Michael Koozo
Attorney, Agent, or Firm—Pitts and Brittian

[57] ABSTRACT

A compressor/pump engine (10) is provided which includes a wall (12) defining a toroidal cylinder (22). A pair of flywheels (36 and 38) are mounted for rotating with respect to said cylinder (22) on a central axis thereof and with respect to each other. Each of the flywheels carry at least a pair of pistons (50) mounted at selected locations, and preferably 180 degrees apart. These pistons (50) cooperate to define compressing-/pumping and inlet chambers during rotation of the flywheels. A fluid for compressing/pumping is admitted into the inlet chambers and then removed from the compressing/pumping chambers during operation. A device (70) is also provided to control the speed of revolution of the pistons during the compressing/pumping cycling such that the compression/pumping and inlet chambers are defined at selected locations during a cycle of the compressor/pump.

17 Claims, 5 Drawing Sheets

COMPRESSOR/PUMP

This is a continuation-in-part application based upon parent application Ser. No. 878,350 filed June 25, 1986 and now U.S. Pat. No. 4,716,870 issued on Jan. 5, 1988.

TECHNICAL FIELD

This invention relates generally to rotary devices wherein a fluid is compressed/pumped by device having a toroidal cylinder with revolving pistons mounted therein. The pistons rotate a varying angular velocities to selectively define compressing/pumping chambers during operation.

Background Art.

Heretofor, various internal combustion engines have been known which employ toroidal shaped cylinders. Known prior art devices are described in the following U.S. Pat. Nos.: 1,353,099, issued to N. B. Wales, on Sept. 14, 1920; 2,651,206, issued to H. J. LaVeille on Sept. 8, 1953; 3,080,856, issued to H. J. Berry on Mar. 12, 1963; 3,516,392, issued to P. E. Morgan on June 23, 1970; 3,580,228, issued to O. Rocha on May 25, 1971; and 3,602,203, issued to R. C. Mowry on Aug. 31, 1971.

It will be noted upon viewing certain of these various prior art devices, that complex mechanisms are used both in the structure of the cylinders and in the devices for controlling the revolution of the pistons. It will further be noted that certain of the prior art devices incorporate pistons which revolve within the cylinder in opposite directions which requires a complete termination of the motion of the piston prior to a reversal of its direction of travel. It is commonly known that such direction reversal results in a loss of efficiency and a reduction in fuel economy.

Because of the complexity of these devices, they have been used only as internal combustion engines and not as compressors/pumps. The term compressor/pump is used herein since operation for either compressing or pumping is substantially the same except for the size of the outlet ports.

Accordingly, it is an object of the present invention to provide an improved compressor/pump having a toroidal cylinder within which the piston revolve in a unitary direction but at varying speeds during the operating cycle.

Another object of the present invention is to provide such a compressor/pump which can be readily manufactured and relatively easily maintained.

Another object of the present invention is to provide such a compressor/pump with enhanced efficiency characteristics resulting in part from elimination of the necessity for the pistons to revolve in opposite and/or reversing directions, and the inherent lighter weight.

DISCLOSURE OF THE INVENTION

Other objects and advantages will be obvious, and will appear in part hereinafter, and will be accomplished by the present invention which provides an improved compressor/pump having a toroidal cylinder. At least one pair of flywheels is mounted for revolution with respect to said cylinder on a central axis thereof, and with respect to each other. Pistons are carried by each of the flywheels. More specifically, a pair of pistons is mounted on each of the flywheels at selected locations. These pistons revolve in the same direction, but at varying speeds, i.e., at different angular velocities, and thereby cooperate to define with the cylinder, compressing/expanding chambers during the operating cycle. Means are provided for admitting a fluid for compressing/pumping into the chamber through the wall of the cylinder. Outlet ports are provided for the discharge of the fluid at appropriate locations so as to achieve the compressing/pumping operation. Further, a device is provided for controlling the mode of operation of the pistons and the flywheels such that they revolve in the same direction within the cylinder at varying speeds of revolution during the compressor/pump cycle to sequentially define is admitted and compressed/pumped, respectfully.

BRIEF DESCRIPTION OF THE DRAWINGS consideration of the following description in connection with the accompanying drawings in which.

BEST MODE FOR CARRYING OUT THE INVENTION

Figure 1:
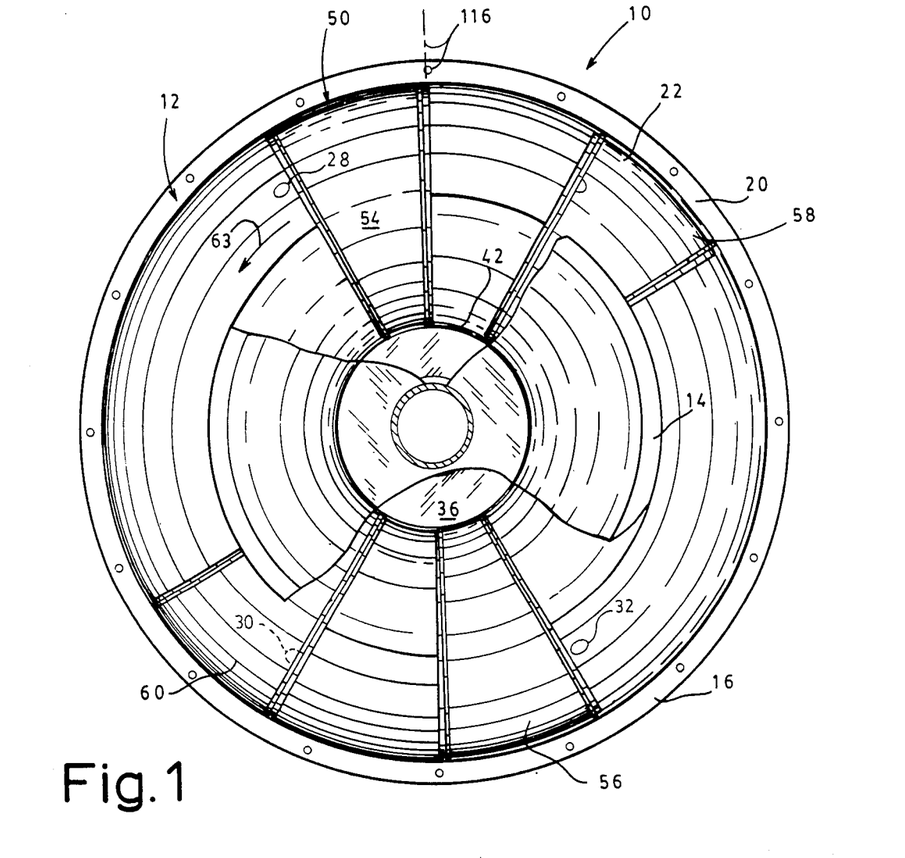
FIG. 1 is an elevation view of a portion of a compressor/pump constructed in accordance with various features of the present invention, with portions of the wall removed to delineate the pistons mounted within the toroidal cylinder.
Figure 2:
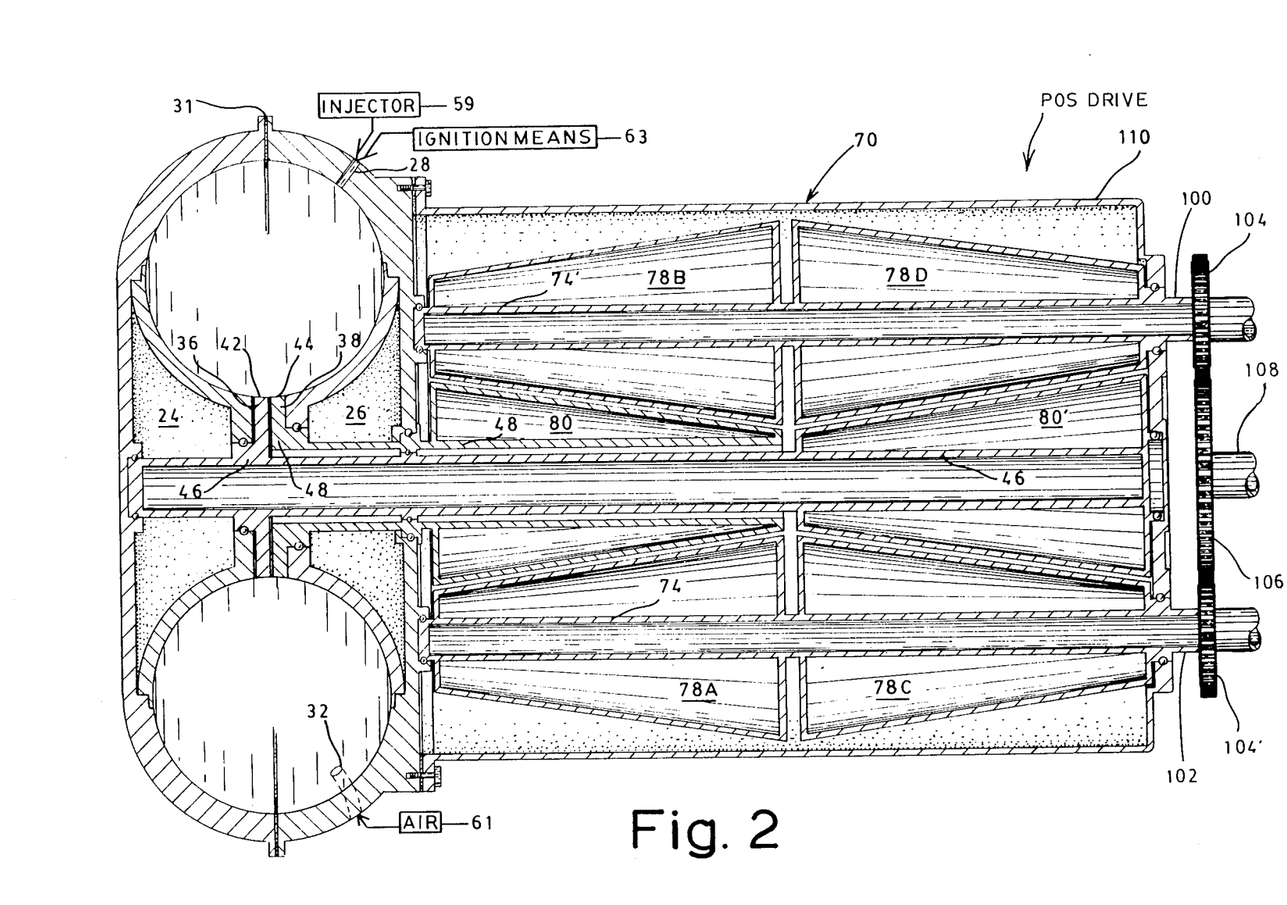
FIG. 2 is a sectional side elevation view of a compressor/pump constructed in accordance with various features of the present invention. This figure further depicts a device for controlling the mode of operation of the pistons.
Figure 3:
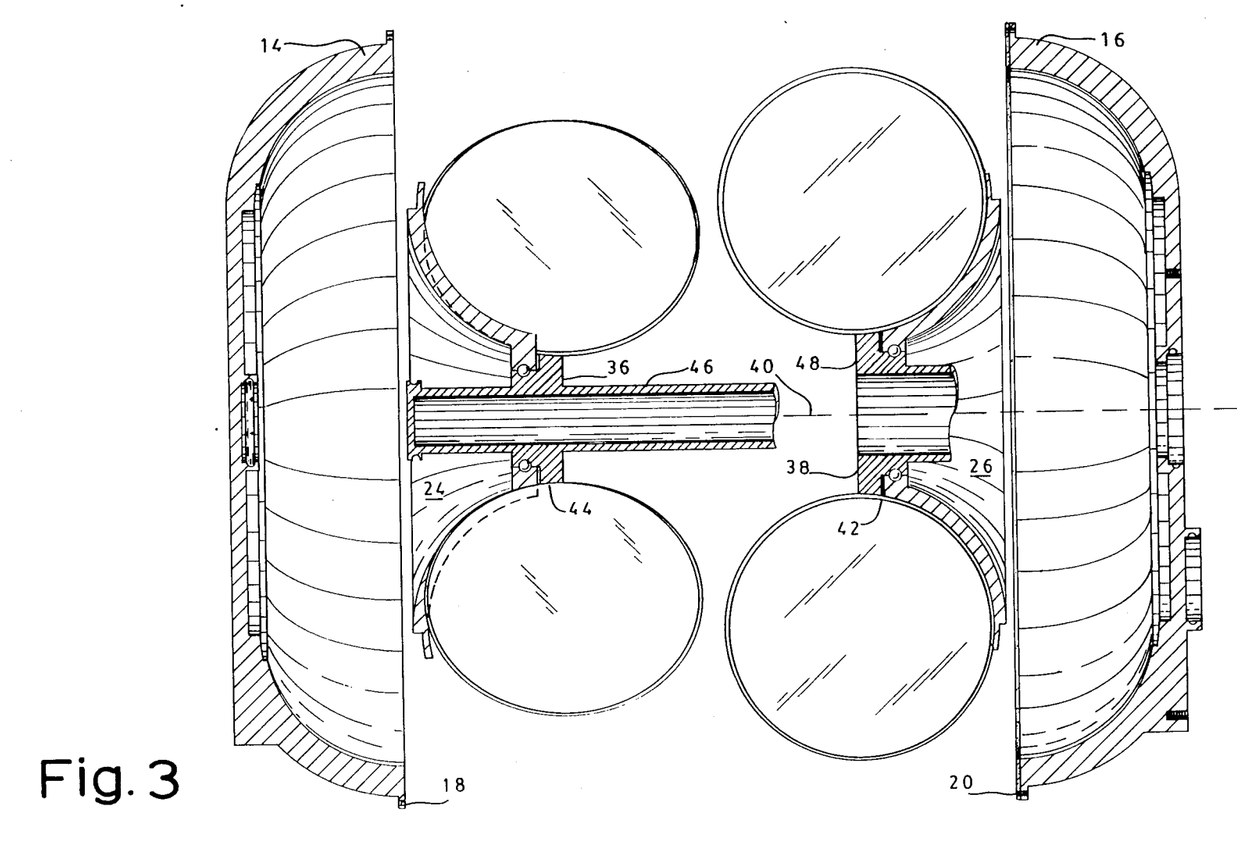
FIG. 3 illustrates a partially exploded view of the wall portion of the compressor/pump defining the toroidal cylinder.

Referring now to the figures, a compressor/pump 10 constructed in accordance with various features of the invention is illustrated in FIG. 1. This device 10 includes wall means generally indicated at 12 which is fabricated from two mating members 14 and 16 illustrated in FIGS. 1 and 3. These wall members 14 and 16, are joined as by being bolted together along their outer perimeter 18 and 20, respectfully, as illustrated in FIGS. 2 and 3. These wall members, when joined, define a toroidal cylinder 22. This cylinder 22 has a substantially circular cross-section which is apparent upon reviewing FIG. 2 although the cylinder can have other cross-sectional configurations. The device including the wall members, can be fabricated from various materials including, but not limited to, ceramics, iron, steel, aluminum, etc. Further, the components of the compressor/pump are inherently balanced. It will be noted below that the construction of the device is of relatively simple configuration to reduce the cost of mass production.

In the preferred embodiment, the toroidal cylinder 22 is partially constructed with cylinder defining member 24 and cylinder defining member 26 illustrated in FIG. 3. These members 24 and 26 are mounted in juxtaposed relationship and carried within the wall members 14 and 16, respectfully. It will be noted that these cylinder defining members 24 and 26 combine with the wall members 14 and 16 depicted in FIG. 2 to form the toroidal cylinder 22. Thus, FIG. 3 shows these members 26 and 24 in an exploded view and separated prior to construction of the toroidal cylinder depicted in greater detail in FIG. 2.

It will be recognized that the wall means 12 can be fabricated from two mating members which define the toroidal cylinder 22. In this connection, the members 24 and 26 can be integrally formed with the wall means 12.

As necessary, or desired, a suitable gasket such as the gasket 31 depicted in FIG. 2 can be inserted between the perimeters 18 and 20 of the wall members 14 and 16, respectfully, to assist in preventing the escape of any fluid from the cylinder 22.

Suitable ports or openings, such as the openings 28, 29, 30 and 32 are provided for selectively admitting a fluid for compressing/pumping into the toroidal cylinder and for removing this fluid from the toroidal cylinder. These ports will be defined in greater detail hereinafter, and are preferably fabricated within the wall means 12 to permit pistons to pass over the ports with minimal resistance. The specific size of the "outlet" ports will depend upon the function of the device, with larger ports used for pumping operations in contrast to compressing.

In the preferred embodiment of the compressor/pump, a pair of flywheels 36 and 38 are rotatably mounted along the central axis 40 of the cylinder 22. These plates or flywheels include outer edges such as the outer edge 42 depicted in FIG. 2 of flywheel 36 which form the intermost portion of the toroidal cylinder 22. Similarly, the outer edge 44 of the flywheel 38 is shown in FIG. 2.

Figure 6:
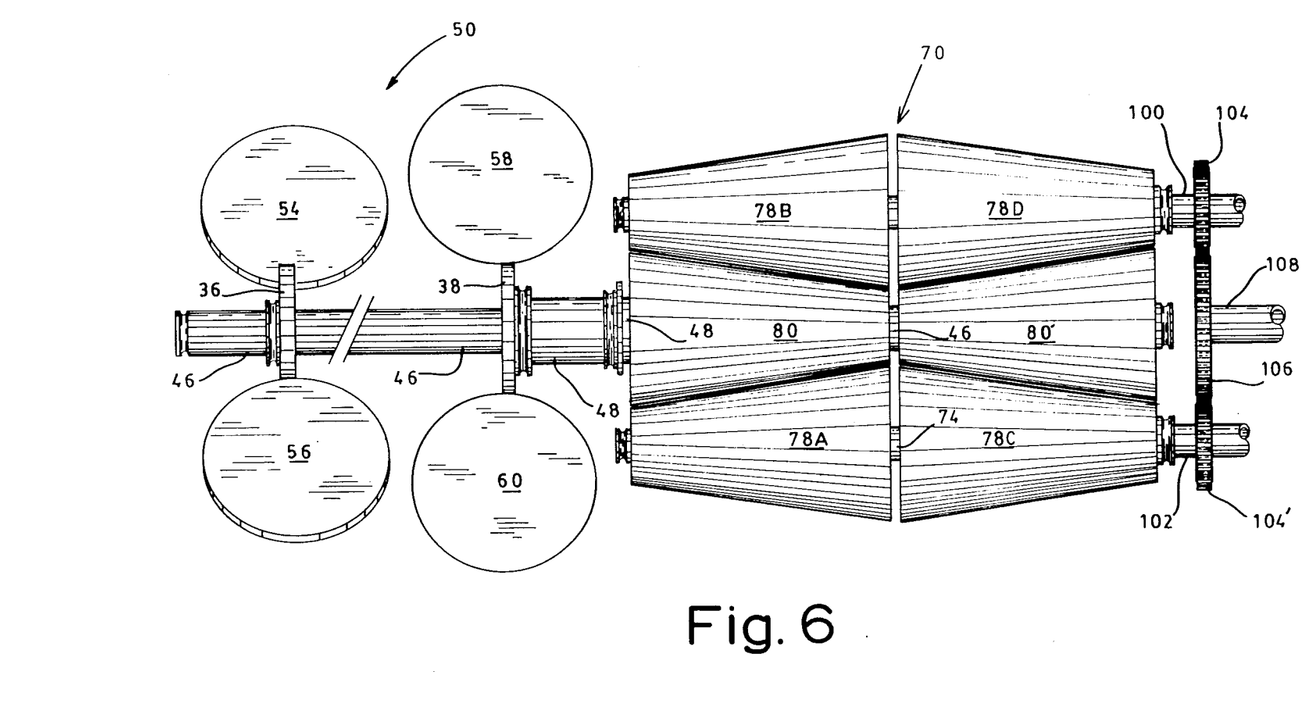
FIG. 6 is a diagrammatic illustration of a compressor/pump constructed in accordance with the present invention with the mode control device attached. This illustration depicts the power input shaft. The pistons are removed from their regular orbit of revolution, i.e., the toroidal cylinder, for purposes of illustration.

Each of these two flywheels 36 and 38 are carried by drive shafts. More specifically, flywheel 36 is carried by drive shaft 46, and flywheel 38 is carried by drive shaft 48. It will be noted that these drive shafts are proportioned such that drive shaft 46 is coaxial with and is received within drive shaft 48. In FIG. 6, drive shaft 46 is shown as it is being inserted into drive shaft 48. It will be recognized that this shaft 46 will be pushed into hollow shaft 48 until the piston parts described in greater detail below align such that they will revolve in the same orbit, i.e., within the toroidal cylinder 22. The flywheels 36 and 38 rotate independently of each other, and in the preferred embodiment, always rotate in the same rotational direction, such as counter-clockwise.

Piston means generally indicated at 50 in FIGS. 1 and 6 are provided. More specifically, the piston means 50 comprises a first pair of pistons 54 and 56, which are mounted on the perimeter 42 of the flywheel 36. It will be noted that pistons 54 and 56 are mounted on opposite sides, or more specifically, 180 degrees apart on the flywheel 36. In this connection, the flywheel with the operatively associated pistons remains balanced. Similarly, pistons 58 and 60 are mounted on opposite sides, or 180 degrees apart, on flywheel 38 as illustrated in FIG. 1, and diagrammatically depicted in FIG. 6.

Figure 5:
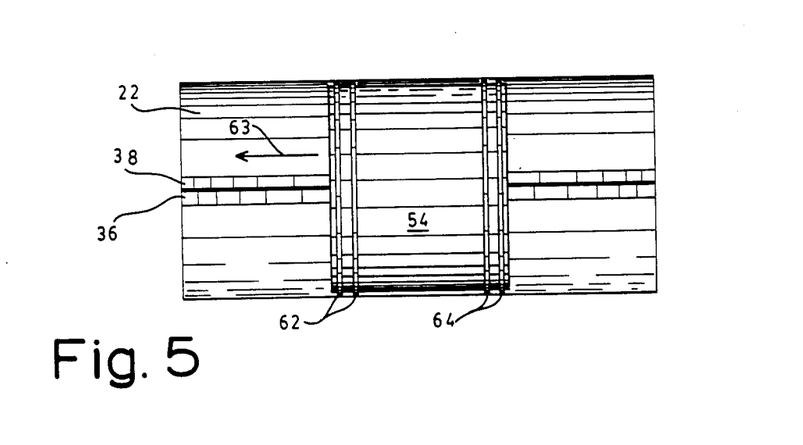
FIG. 5 represents a stretched out view of a piston mounted within the cylinder on its operatively associated flywheel.

Each of the illustrated pistons 54, 56, 58 and 60 are slidably received within the toroidal cylinder 22 as depicted in FIG. 1. A typical piston 54, which is representative of each of the other pistons 56, 58 and 60 is depicted in FIG. 5. (Also see FIG. 1.) This piston 54 is substantially wedge-shaped as shown in FIG. 1 when viewed in a side elevation illustration. Its cross-sectional outline, however, is proportioned for being received within the toroidal cylinder 22, such that the piston rings 62 along or proximate the leading face of the piston as it revolves in the direction of arrow 63, and the piston ring 64 proximate the trailing face of the piston serve to form an air tight or hermetic seal or barrier with the operatively associated wall of the cylinder 22. This cylinder 22 is shown in a partially stretched out view in FIG. 5 for purposes of clarity. It will be noted that each of the pistons are similarly shaped and provided with similar rings to establish hermetic seals between the compressing and expanding (intake) chambers of the device during regular operation. For example, the rings permit "compression" between juxtaposed faces of cooperating pistons. For compressible fluids actual compression occurs; for non-compressible fluids, the fluid is just forced (pumped) through an appropriate outlet port. Further, it should be noted that "compression" is achieved in the chambers defined between adjacent pistons, as depicted in FIG. 1, by movement of one of the pistons on flywheel 36 towards a piston mounted on flywheel 38. This is achieved, as will be described in greater detail hereinafter, by rotation of the flywheels which carry the revolving pistons at different angular velocities such that the cooperating pistons approach and retreat one from the other due to the varying pistons are mounted.

Figure 4:
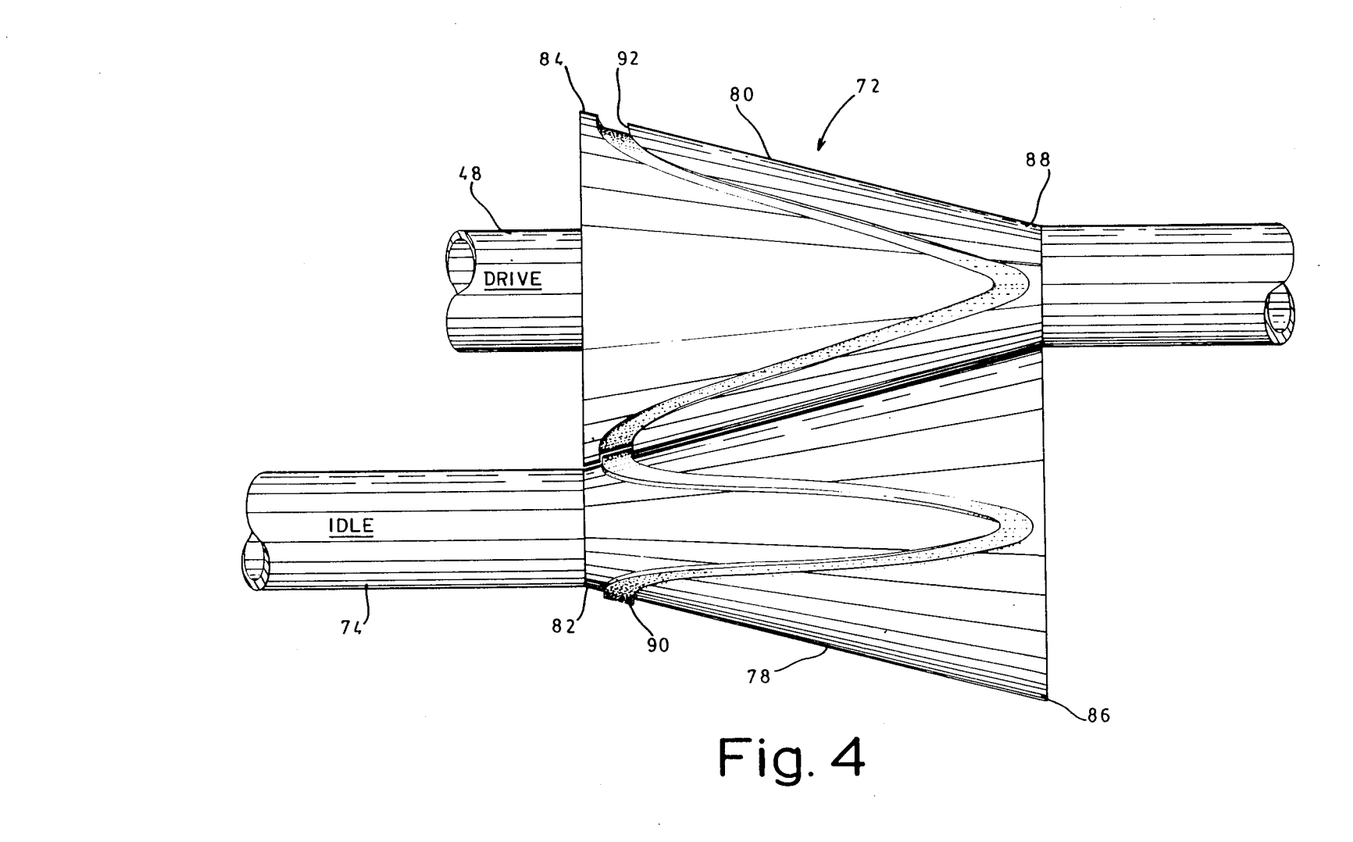
FIG. 4 represents an elevation view of a suitable coupling device used in connection with controlling the mode of operation of the pistons.

Means generally indicated at 70 in FIGS. 2 and 6 serve to control the mode of operation of the piston means 50. More specifically, the mode control means or device 70 controls the angular velocity with which the flywheels and pistons carried thereby revolve for defining the "compression" and intake chambers during a compressing/pumping cycle. In the depicted embodiment, the mode control means 70 includes a coupling device 72 illustrated in FIG. 4. This coupling device is designed such that the shaft 74 and the shaft 48 (see FIG. 4) will rotate at different angular velocities during a cycle for purposes which will be more clearly described herein below. To this end, shaft 74 caries coupling member 78 which is mechanically connected to coupling member 80 mounted on drive shaft 48. The coupling member 78 is substantially conical in configuration and defines a substantially circular cross-sectional outline. The smaller end portion 82 of the coupling member 78 is operatively associated with the larger end portion 84 of the coupling member 80 as illustrated. Similarly, the larger end portion 86 of the coupling member 78 is operatively associated with the smaller end portion 88 of the coupling member 80. As shown in FIG. 4, coupling member 78 carries a raised substantially sinusoidal connecting member 90 which is received within a similarily shaped but recessed groove 92 defined in the connecting member 90. The raised member 90 and recessed groove 92 form a gear engagement means. Thus, upon rotation of the shaft 74, rotational forces are imparted to the shaft 48 through the coupling device 72. It will be noted, however, that the rotational speed of the shaft 48 will sometimes be greater, equal to and less than, the speed of rotation of the shaft 74. For example, when the connecting member 90 at the smaller end portion 82 of the member 78 is received within the groove 92 at the larger end portion 84 of the member 80, shaft 48 will rotate at a lesser speed than the the coupling members 78 and 80 is accomplished proximate the larger end portion 86 of coupling member 78, shaft 48 will rotate at a greater speed than the rotation of the shaft 74.

It is to be understood that the other selected configurations of gear engagement means which provide the same function as described can be substituted for the configuration as illustrated.

The mode control means 70 which includes the drive coupling members 80 and 80' of FIG. 2, and the driven coupling members 78A–D, will now be described in greater detail. This mode control means 70 serves to control or synchronize the speed of revolution or angular velocity of the pistons during a compressing/pumping cycle which will be described herein below. More specifically, as shown in FIGS. 2 and 6, the driven coupling members 80 and 80' are mounted on the drive shafts 48 and 46, respectfully. Thus, during the cycle as the shaft 46 is rotated, the pistons 54 and 56 revolve, and the driven couplng member 80' is rotated. Similarily, as shaft 48 is rotated, the pistons 58 and 60 revolve and the driven coupling member 80, mounted on shaft 48 will likewise rotate. As coupling member 80 rotates, rotational forces are imparted to the driven coupling members 78A and 78B which are mechanically connected to the driven coupling member 80 as described in connection with FIG. 4. Similarily, as coupling member 80' is driven, rotational forces are imparted in the driven coupling members 78C and 78D mechanically connected thereto. It will be noted in FIG. 6 and in FIG. 2 that coupling members 78B and 78D are mounted on shaft 100, and coupling members 78A and 78C are mounted on shaft 102. Each of these shafts caries a gear 104, 104'. These gears 104, 104' are mechanically connected one to the other as illustrated in FIGS. 2 and 6 through gear 106 carried by shaft 108. This shaft 108 serves as a preferred input to the compressor/pump and will be rotated by any suitable motor means. The shafts 100 and 102 can serve as power take-off points or outputs if desired.

It will be noted in FIG. 2 that shafts 100 and 102 are journalled in the mode control means housing 110. By mounting the coupling members as illustrated in FIGS. 2 and 6, the mode of operation including the angular velocity of the pistons cooperating to define the compression and intake chambers during the cycle is controlled or synchronized. A complete cycle of the compressor/pump will now be described to more clearly illustrate this point.

Assume that the original orientation of the pistons to be that depicted in FIG. 1, and the 0 degree position to be indicated at 116 in FIG. 1 with the degrees increasing in a counter-clockwise direction, i.e., in the direction of the arrow 63, until the complete revolution is completed and the piston 54 has returned to its original orientation. The ratio of the coupling device 72 and its respective coupling members is designed such that pistons 54 and 56 can revolve from their beginning positions counter-clockwise 162 degrees, while pistons 58 and 60 mounted on flywheel or plate 38 rotate 18 degrees. At the beginning of the cycle, a fluid to be compressed/pumped is admitted into the chamber defined between pistons 54 and 58 at a point where the pistons of each pair are spaced substantially apart. This typically is at 30 and 210 degrees in the referenced system.

The mode control 70, as operated by the input shaft 108, causes piston 54 to pass the outlet ports 30 which forces fluid from the previous compression/pumping stroke from the cylinder. These outlet ports 30 are located at approximately 150 and 330 degrees on the reference system discussed above in connection with FIG. 1. At the same time as piston 54 is being forced generally downward in FIG. 1, piston 56 travels from the 180 degrees location to 330 degrees, and "compresses" fluid which enters through the inlet port 32 between pistons 56 and 58. It will be noted that the inlet ports are located at approximately 30 and 210 degrees. The mode control means limits the travel of piston 58 to movement from approximately 330 degrees to 360 degrees or 0. Since each piston takes up approximately 12 degrees, the trailing face of piston 56 by approximately 6 degrees at their nearest location.

A rotary drive means of conventional design will be attached to the power train as described in connection with FIGS. 2 and 6, and can be mechanically connected through drive shaft 108. The rotational ratio established by the coupling members together with the size of the pistons can be altered to achieve varying compression ratios. Also, the port locations can be changed to achieve the same purpose.

A cooling system can be provided if desired by simply placing a water jacket around the chamber or by casting passageways for coolant in the walls of the chamber itself. Also, cooling can be achieved by attaching external heat sinks to wall means 12.

It is also possible to use the compressor/pump as an engine as described in the aforementioned U.S. Pat. No. 4,716,870 which is incorporated herein by reference.

Having discussed the cycle of the compressor/pump and the mode control means, it will now be understood that compressing/pumping is achieved by use of the mode control means 70 which allows one plate or flywheel to turn at substantially faster speeds than the other flywheels. At the point at which the pistons almost touch, the mode control means through the use of the coupling members described herein above shifts the rotational speed ratio of the shafts so as to slow the rear piston and to allow the forward piston to surge ahead at substantially faster speeds (approximately 2 to 25 times the speed of the other plate) until the faster pistons nearly touch the pistons ahead of them at which time they are slowed and the cycle repeats itself. The compression and intake chambers are thus defined during this process.

Suitable seals will be provided between the flywheels and between each flywheel and the wall means. These seals will serve to prevent fluids from escaping during operation. Further, the device of the present invention is designed to have few moving parts which will reduce its construction and maintenance costs. It is also inherently smaller in size and lighter in weight with respect to a comparable conventional unit.

While a preferred embodiment of the invention has been described and illustrated, there are modifications and alternate embodiments that can be constructed without departing from the spirit and scope of the invention described in the attached claims and equivalents thereof.

I claim:
1. A compressor/pump, which comprises:
wall means defining at least one toroidal cylinder;
at least one pair of flywheels mounted for rotation with respect to said cylinder around a central axis thereof and with respect to each other;
piston means within said cylinder including a first pair of pistons mounted on one of said flywheels at selected locations, and a further pair of pistons mounted on another of said flywheels at selected locations, said pistons cooperating to define with said cylinder compressing/pumping and inlet chambers during rotation of said flywheels and said pistons attached thereto;

means for admitting a fluid for compressing/pumping into said inlet chambers through said wall means of said cylinder;

means for controlling the mode of operation of said piston means and said flywheels whereby said first and further pairs of pistons revolve in the same direction within said cylinder at varying angular velocities during cycles of said compressor/pump, said means for controlling said mode including a. a first rotating shaft carrying said one of said flywheels, b. a second rotating shaft carrying said another of said flywheels, c. at least one first gear member carried on said first rotating shaft, said first gear member defining a substantially conically configured surface with a first end of a first selected diameter and a second end of a second selected larger diameter, said surface provided with first gear engagement means of a selected configuration, d. at least one second gear member disposed proximate said first gear member having a conically configured surface with a first end of one selected diameter proximate said first end of said first gear member, said surface of said second gear member provided with further gear engagement means of a selected configuration operatively associated with said gear engagement means on said surface of said first gear means whereby said second grear means is rotatable in a direction opposite said first gear means, said configuration of said first and further gear engagement means of said first and said second gear members selected whereby intermeshing between said first and said second gear members reciprocates between ends of said gear members whereby said second gear member is rotated at said varying angular velocities with respect to said first rotating shaft, and e. gear coupling means connected between said second gear means and said second rotating shaft to rotate said second rotating shaft at said varying angular velocities with respect to said first rotating shaft to thereby cause said pistons to define said compressing/pumping and inlet chambers within said cylinder during an engine cycle; and rotary drive means connected to said mode controlling means for rotating said gear members.

2. The compressor/pump of claim 1 wherein said wall means is fabricated from two mating wall members joined along their perimeter to define said toroidal cylinder.

3. The compressor/pump of claim 2 wherein said wall members carry juxtaposed cylinder defining members which combine with said wall members to form said toroidal cylinder upon joining said wall members.

4. The compressor/pump of claim 2 including gasket means interposed between said joined wall members to assist in forming a hermetic seal therebetween.

5. The compressor/pump of claim 1 including port means defined in said wall means, said port means including a plurality of ports spaced at selected locations, at least one of said ports serving as an opening through which a fluid is admitted into said cylinder, and at least one of said ports serving as an outlet through which compressed/pumped fluid is removed from said cylinder.

6. The compressor/pump of claim 2 wherein said flywheels are rotatably mounted between said wall members such that outer edges of said flywheels form an intermost portion of said toroidal cylinder through which said pistons revolve.

7. A compressor/pump, which comprises:

wall means defining at least one toroidal cylinder, said wall means being fabricated from two mating members joined along their perimeter to define said toroidal cylinder;

at least one pair of flywheels mounted for rotation with respect to said cylinder around a central axis thereof and with respect to each other, one flywheel being carried by a first rotating shaft, and a further flywheel being carried by a further hollow rotating shaft wherein said first shaft is rotatably received within said further hollow shaft, such that said flywheels can rotate independently of each other, and in the same direction with varying angular velocities;

piston means including a first pair of pistons mounted on said one flywheel at selected locations, and a further pair of pistons mounted on said further flywheel at selected locations, said pistons cooperating to define with said cylinder compressing/pumping and inlet chambers during rotation of said flywheels and said pistons attached thereto at said varying angular velocities;

means for admitting a fluid to be compressed/pumped into said inlet chamber through said wall means of said cylinder;

means for controlling the mode of operation of said piston means and said flywheels whereby said first and further pairs of pistons revolve in the same direction within said cylinder at said varying angular velocities during cycles of said compressor/pump, said means for controlling said mode of operation including a. at least one first gear member carried on said first rotating shaft, said first gear member defining a conically configured surface with a first end of a first selected diameter and a second end of a second selected larger diameter, said surface provided with gear engagement means of a selected configuration, b. at least one second gear member, disposed proximate said first gear member, having a conically configured surface with a first end of one selected diameter proximate said second end of said first gear member and a second end of a selected larger diameter proximate said first end of said first gear member, said surface of said second gear member provided with gear engagement means of a selected configuration operatively associated with said gear engagement means on said surface of said first gear member whereby said second gear member is rotatable in a direction opposite said first gear member whereby said second gear member is rotatable in a direction opposite said first gear member, said configuration of said gear engagement means of said first and said second gear members selected whereby intermeshing between said first and said second gear members reciprocates between ends of said gear members whereby said second gear member is rotated at said varying angular velocities with respect to said first rotating shaft, and c. gear coupling means connected between said second gear member and said second rotating shaft to rotate said second rotating shaft at said varying angular velocities with respect to said first rotating shaft to thereby define said compressing/pumping and inlet chambers by said piston means within said cylinder during a compressing/pumping cycle; and rotary drive means connected to said mode controlling means for rotating said gear members.

8. The compressor/pump of claim 7 wherein members which combine with said wall members to form said toroidal cylinder upon joining said wall members.

9. The compressor/pump of claim 7 including gasket means interposed between said joined wall members to assist in forming a hermetic seal therebetween.

10. The compressor/pump of claim 7 including port means defined in said wall means, said port means including a plurality of ports spaced at selected locations, at least one of said ports serving as an opening through which said fluid is admitted into said cylinder, and at least one of said ports serving as an opening through which compressed/pumped fluid is removed from said cylinder.

11. The compressor/pump of claim 7 wherein said flywheels are rotatably mounted between said wall members such that outer edges of said flywheels form an intermost portion of said toroidal cylinder through which said pistons revolve.

12. The compressor/pump of claim 1 wherein said gear engagement means on said conically configured surface of said first gear member is a substantially sinusoidal ridge extending proximate wherein said engagement means on said conically configured surface of said second gear member is a end to receive said ridge whereby said first and second gear members are coupled for rotation at said varying angular velocities of said gear members.

13. The compressor/pump of claim 7 wherein said gear engagement means on said conically configured surface of said first gear member is a substantially sinusoidal ridge extending proximate said first end to proximate said second end, and wherein said engagement means on said conically configured surface of said second gear member is a substantially sinusoidal groove extending proximate said first end to proximate said second end to receive said ridge whereby said first and second gear members are coupled for rotation at said varying angular velocities of said gear members.

14. The compressor/pump of claim 1 wherein said gear coupling means connected between said second gear member and said second rotating shaft comprises:
an idler shaft attached to and rotatable with said second gear member;
a third gear member mounted upon said idler shaft and rotatable therewith, said third gear member defining a substantially conically configured surface with a first end of a first elected larger diameter, said surface provided with gear engagement means of a selected configuration;
a fourth gear member mounted upon said second rotating shaft and disposed proximate said third ear member, said fourth gear member defining a 1 substantially conically configured surface with a first end of one selected diameter proximate said second end of said third gear member and a second 1 end of a selected larger diameter proximate said first end of said third gear member, said surface of said fourth gear member provided with gear engagement of a selected configuration means operatively associated with said gear engagement means on said surface of said third gear member whereby said fourth gear member is rotatable in a direction opposite said third gear member and said second rotating shaft is rotated in the same direction as said first rotating shaft at said varying angular velocities relative to said first rotating shaft.

15. The compressor/pump of claim 7 wherein said gear coupling means connected between said second gear member and said second rotating shaft comprises:
an idler shaft attached to and rotatable with said second gear member;
a third gear member mounted upon said idler shaft and rotatable therewith, said third gear member defining a substantially conically configured surface with a first end of a first selected diameter and a second end of a second selected larger diameter, said surface provided with gear engagement means of a selected configuration;
a fourth gear member mounted upon said second rotating shaft and disposed proximate said third gear member, said fourth gear member defining a substantially conically configured surface with a first end of one selected diameter proximate said second end of said third gear member and a second end of a selected larger diameter proximate said first end of said third gear member, said surface of said fourth gear member provided with gear engagement means of a selected configuration operatively associated with said gear engagement means on said surface of said third gear member whereby said fourth gear member is rotatable in a direction opposite said third gear member and said second rotating shaft is rotated in th same direction as said first rotating shaft at said varying angular velocities relative to said first rotating shaft.

16. A compressor/pump comprising:
wall means defining at least one toroidal cylinder, said wall means being fabricated from two mating members joined along their perimeter to define said toroidal cylinder;
at least one pair of flywheels mounted for rotation with respect to said cylinder around a central axis thereof and with respect to each other, one flywheel being carried by a first rotating shaft, and a further flywheel being carried by a further hollow rotating shaft wherein said first shaft is rotatably received within said further hollow shaft, such that said flywheels are rotatably independent of each other, and rotate in the same direction with varying angular velocities;
piston means within said cylinder including a first pair of pistons mounted on said one of said flywheels at selected locations, and a further pair of pistons mounted on said further flywheel at selected locations, said pistons cooperating to define with said cylinder compressing/pumping and inlet chambers during rotation of said flywheels and said pistons attached thereto at said varying angular velocities;
means for admitting a fluid to be compressed/pumped into said inlet chambers through said wall means of said cylinder;

means for removing compressed/pumped fluid from said compressing/pumping chambers;

means for controlling the mode of operation of said piston means and said flywheels whereby said first and further pairs of pistons revolve in the same direction within said cylinder at said varying speeds of revolution during compressing/pumping cycles of said compressor/pump, said means for controlling said mode of operation including a. at least one first gear member carried on said first rotating shaft, said first gear member defining a substantially conically configured surface with a first end of a first selected diameter and a second end of a second selected larger diameter, said surface provided with a substantially sinusoidal ridge extending proximate said first end to proximate said second end of said first gear member, b. at least one second gear member, disposed proximate said first gear member, having a substantially conically configured surface with a first end of one selected diameter proximate said larger selected diameter of said first gear member and a second end of a selected larger diameter proximate said first end of said first gear member, said surface of said second gear member provided with a substantially sinusoidal groove extending proximate said first end to proximate said second end of said second gear member to receive said ridge whereby said first and second gear members are coupled for rotation and said second gear member is rotatable in a direction opposite said first gear member at said varying angular velocities relating to said first gear member, and c. gear coupling means connected between said second gear member and said second rotatable shaft whereby said second rotatable shaft is rotatable at said varying angular velocities with respect to said first rotating shaft to thereby define said compressing/pumping and inlet chambers within said cylinder during an operating cycle; and rotary drive means connected to said mode controlling means for rotating said gear members.

17. The compressor/pump of claim 16 wherein said gear coupling means connected between said second gear member and said second rotating shaft comprises:

an idler shaft attached to and rotatable with said second gear member;

a third gear member mounted upon said idler shaft and rotatable therewith, said third gear member defining a substantially conically configured surface with a first end of a first selected diameter and a second end of a second selected larger diameter, said surface provided with gear engagement means;

a fourth gear member mounted upon said second rotating shaft and disposed proximate said third gear member, said fourth gear member defining a substantially conically configured surface with a first end of one selected diameter proximate said second end of said third gear member and a second end of a selected larger diameter proximate said first end of said third gear member, said surface of said fourth gear member provided with gear engagement means operatively associated with said gear engagement means on said surface of said third gear member whereby said fourth gear member is rotatable in a direction opposite said third gear member and said second rotating shaft is rotated in the same direction as said first rotating shaft at said varying angular velocities relative to said first rotating shaft.

* * * * *